M. ACKERMAN.
Self-Dropper and Marker for Corn-Planters.
No. 198,261. Patented Dec. 18, 1877.
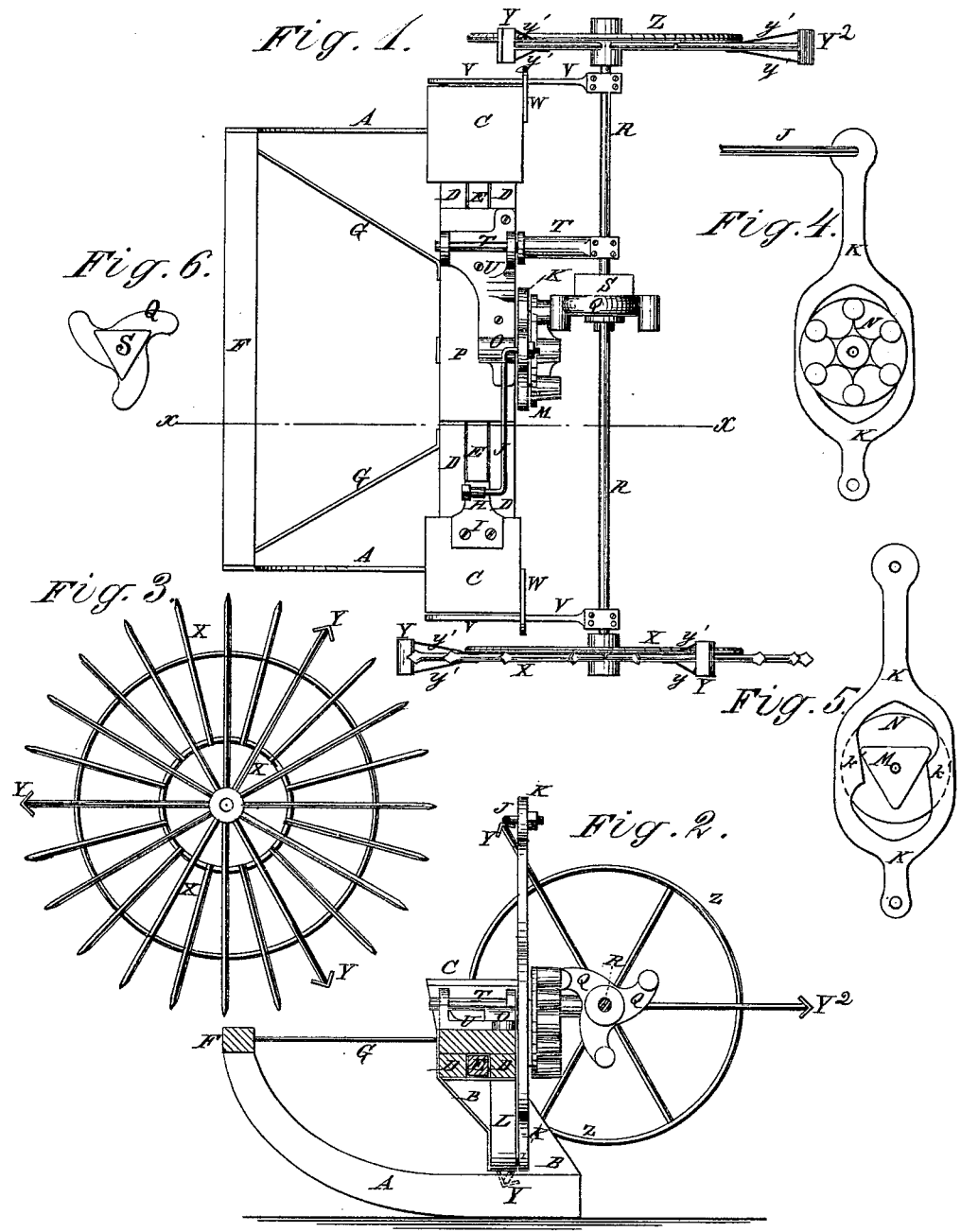
WITNESSES:
H. Rydquist
J. H. Scarborough
INVENTOR:
M. Ackerman
BY Munn & Co.
ATTORNEYS.

UNITED STATES PATENT OFFICE.

MICHAEL ACKERMAN, OF STEAMBOAT ROCK, IOWA.

IMPROVEMENT IN SELF DROPPER AND MARKER FOR CORN-PLANTERS.

Specification forming part of Letters Patent No. 198,261, dated December 18, 1877; application filed September 10, 1877.

*To all whom it may concern:*

Be it known that I, MICHAEL ACKERMAN, of Steamboat Rock, in the county of Hardin and State of Iowa, have invented a new and useful Improvement in Self Dropper and Marker for Corn-Planters, of which the following is a specification:

Figure 1 is a top view of a part of a corn-planter to which my improvement has been applied. Fig. 2 is a detail vertical section of the same, taken through the line $xx$, Fig. 1. Fig. 3 is a detail side view of the drive-wheel. Fig. 4 is a detail rear view of the operating-lever. Fig. 5 is a detail front view of the operating-lever. Fig. 6 is a detail view of the three-armed cam-wheel.

Similar letters of reference indicate corresponding parts.

The object of this invention is to furnish an improved device for attachment to any ordinary corn-planter, to operate the dropping-slide and mark the ground opposite the hills, and which shall be simple in construction and reliable in use.

The invention consists in the combination of the swiveled arm and its swivel-block or plate, and the pivoted arms and their keepers, with the axle and the frame-work of the machine, to allow the ends of said axle to move up and down as its wheels pass over uneven ground; in the combination of the three-armed cog-wheel provided with the triangular wheel, the cog-wheel provided with the triangular wheel, the lever provided with the inclines upon the opposite sides of the opening in its widened middle part, the spindle, the connecting-rod, and the lever, with the axle, and the seed-dropping slide, to enable said dropping-slide to be operated by the revolution of the said axle; in the drive-wheel formed of the hub, the two rings, and the long and short spokes, alternating with each other, and sharpened at their outer ends, in combination with the axle for driving the dropping mechanism; in the combination of the skeleton-wheel, formed of the hub, the ring, and the long and short spokes with the axle for carrying a set of markers, and the end of the said axle.

A are the runners, to the rear ends of which are attached the lower ends of the conductor-spouts B. To the upper ends of the spouts B are attached the seed-hoppers C, and the cross-bars or board D, by which said hoppers and are connected and held in their proper relative positions, and in a slot or groove in which the dropping-slide E works.

The forward ends of the runners A are connected by a cross-bar, F, and are strengthened in position by the inclined braces G, the forward ends of which are attached to the forward ends of the said runners, and their rear ends are attached to the cross-bars D. As thus far described there is nothing new.

In the dropping-slide E, near one end, is formed a hole to receive the lower end of the lever H, which passes through a hole in a plate, bar, or lug, I, attached to one of the seed-hoppers C, and is intended to serve as a fulcrum to said lever. To the upper end of the lever H is pivoted the outer end of a connecting-rod, J, the inner end of which is pivoted to the upper end of the lever K. The lower end of the lever K is pivoted to the lower end of a hanger, L, the upper end of which is attached to the lower side of the middle part of the bars or boards D.

The middle part of the lever K is made wide, and has a large opening formed through it, to receive the triangular wheel M, formed upon or attached to the forward side of the wheel N. The wheel M N revolves upon a spindle, O, attached to the seat-board P. Upon the inner edge of the lever K, at the opposite sides of its opening, are formed inclines $k'$, for the angles of the wheel M to strike against, so that the said lever K may be vibrated to drop the seed by the revolution of the said wheel M.

Upon the rear side of the wheel N are formed six cogs, against which strike the cogs of the three-armed wheel Q, attached to the axle R. Upon the rear side of the wheel Q is formed a triangular wheel, S, to be operated against by a regulator, to be connected with the machine in such a way that it may be operated by the driver with his foot. (Not shown in the drawing.) The triangular wheel S is so arranged as not to stop the machine while in the act of dropping seed.

The axle R, near the wheel Q S, revolves in bearing in the rear part of the arm T, the forward part of which is swiveled to bearings in a box or plate, U, attached to the seat-board P, so that the end parts of the axle R may rise and fall as its wheels pass over uneven ground.

The end parts of the axle R revolve in bearings in the rear ends of arms V, the forward ends of which are pivoted to the forward part of the outer sides of the seed-boxes C, so that either wheel may rise and fall as it passes over inequalities in the surface of the ground.

The arms V pass through keepers W, attached to the rear parts of the seed-boxes C, to limit the movement of the arms V and keep them in place.

X is the drive-wheel, which is formed by attaching the inner ends of twelve (more or less) long spokes to a hub. These long spokes are strengthened by two rings, attached to them at a little distance from their ends. Between each two long spokes is placed a short spoke, which is attached to the two rings. The outer ends of the spokes are sharpened, so that they enter the ground, and thus turn the axle and operate the seed-dropping mechanism.

To the outer ends of three of the long spokes of the wheel X, and at equal distances apart, are attached the centers of angular plates Y, which are placed across the wheel, and are strengthened by braces $y^1$ attached to their ends and to the said spokes, as shown in Fig. 1.

Z is the wheel, attached to the other end of the axle R. The wheel Z is formed of three long and three short spokes, alternating with each other, attached at their inner ends to a hub, and connected at the outer ends of the short spokes by a ring.

To the outer ends of the long spokes are attached markers $y^2$. The markers of the two wheels mark the ground opposite the hills, so that the hills can be conveniently planted in accurate check-row.

Having thus described my invention, I claim as new and desire to secure by Letters Patent—

1. The combination of the swiveled arm T and its swiveled block or plate U, and the pivoted arms V and their keepers W, with the axle R and the frame-work of the machine, to allow the ends of said axle to move up and down as its wheels pass over uneven ground, substantially as herein shown and described.

2. The combination of the three-armed cog-wheel Q provided with the triangular wheel S, the cog-wheel N provided with the triangular wheel M, the lever K provided with the inclines $k'$ upon the opposite sides of the opening in its widened middle part, the spindle O, the connecting-rod J, and the lever H, with the axle R and the seed-dropping slide E, to enable said dropping-slide to be operated by the revolution of the said axle, substantially as herein shown and described.

3. The drive-wheel X, formed of the hub, the two rings, and the long and short spokes, alternating with each other, and sharpened at their outer ends, in combination with the axle R, for driving the dropping mechanism, substantially as herein shown and described.

4. The combination of the skeleton-wheel Z, formed of the hub, the ring, and the long and short spokes, with the axle R, for carrying a set of markers on the end of the said axle, substantially as herein shown and described.

MICHAEL ACKERMAN.

Witnesses:
PETER BANAGIN,
WM. CAMPBELL.